US007016784B2

(12) United States Patent
Allen et al.

(10) Patent No.: US 7,016,784 B2
(45) Date of Patent: Mar. 21, 2006

(54) METHOD AND SYSTEM FOR PRODUCING A WEATHER FORECAST

(75) Inventors: Myles Robert Allen, Oxford (GB); Matthew Collins, Reading (GB); David Alan Stainforth, Oxford (GB)

(73) Assignee: Isis Innovation Limited, Oxford (GB)

( * ) Notice: Subject to any disclaimer, the term of this patent is extended or adjusted under 35 U.S.C. 154(b) by 0 days.

(21) Appl. No.: 10/476,005

(22) PCT Filed: Apr. 25, 2002

(86) PCT No.: PCT/GB02/01916

§ 371 (c)(1),
(2), (4) Date: Jan. 30, 2004

(87) PCT Pub. No.: WO02/088777

PCT Pub. Date: Nov. 7, 2002

(65) Prior Publication Data

US 2004/0143396 A1 Jul. 22, 2004

(30) Foreign Application Priority Data

Apr. 25, 2001 (GB) .................................... 0110153

(51) Int. Cl.
*G06F 169/00* (2006.01)
*G01W 1/10* (2006.01)

(52) U.S. Cl. .......................................................... 702/3

(58) Field of Classification Search .................... 702/3, 702/4, 2, 5; 324/26; 703/2, 5, 9; 342/26 R, 342/26 A, 26 D
See application file for complete search history.

(56) References Cited

U.S. PATENT DOCUMENTS 6,058,387 A * 5/2000 Campbell et al. ............. 706/60
6,112,225 A * 8/2000 Kraft et al. ................. 709/202
6,216,169 B1 * 4/2001 Booman et al. ............ 709/246
6,275,774 B1 * 8/2001 Baron et al. .................... 702/3
6,339,840 B1 * 1/2002 Kothari et al. .............. 717/149
6,424,917 B1 * 7/2002 Kalkstein et al. .............. 702/3
2002/0091752 A1 * 7/2002 Firlie ......................... 709/201

OTHER PUBLICATIONS

Hansen et al, "Casino-21: Climate Simulation of the 21st Century", World Resource Review 2000, vol. 13, No. 2, p. 187.

Barros et al., "The IFS Model: A Parallel Production Weather Code", Parallel Computing, vol. 21, No. 10, Oct. 1995, pp. 1621-1638.

B. Rodriguez, "Parallelizing Operational Weather Forecast Models for Portahble and Fast Execution", Journal of Parallel and Distributed Computing, vol. 37, Sep. 15, 1996, pp. 159-170.

Geleyn et al., "La Prevision Meteorologique a Moyen Terme", La Recherche, vol. 13, No 131, Mar. 1982.

* cited by examiner

*Primary Examiner*—Donald McElheny, Jr.
(74) *Attorney, Agent, or Firm*—Nixon & Vanderhye P.C.

(57) ABSTRACT

A method of generating short-, medium-range and seasonal-timescale weather or climate forecasts by running an ensemble of computer models on a distributed computing system or network. Individual model integrations are interrogated to select those that most closely ressemble observed conditions in the present and recent past and the forecast based on a weighted average of future predictions based on this subset of the ensemble. The selection criteria determining which models are deemed to fit the observations most closely may be adjusted to optimize the use of observations in forecasting specific climate variables or geographic regions in order to develop forcasts tailored to particular applications.

27 Claims, 5 Drawing Sheets

METHOD AND SYSTEM FOR PRODUCING A WEATHER FORECAST

This application is the U.S. national phase of international application PCT/GB0201916, filed Apr. 25, 2002, which designated the U.S.

BACKGROUND AND SUMMARY

The present invention relates to forecasting, particularly to short to medium term weather forecasting using an ensemble, model-based approach.

Techniques for weather forecasting, which are now largely computer-based, vary depending on the timescale required for the forecast. Short term forecasts of a few days or so use computer models and can be quite accurate. As for longer timescales, such as climate forecasts on longer timescales, although individual weather events are unpredictable at lead times greater than a week or so, it is theoretically possible to make more general predictions, relating to the statistics or probability of weather events, beyond this time horizon. This is possible because there are aspects of the climate system which vary on timescales which are longer than those of individual weather events that can bias their probability of occurrence. The principal climate phenomenon which varies on timescales from seasons to years is known as the El Nino Southern Oscillation (ENSO). ENSO involves a quasi-periodic warming and cooling of the eastern tropical Pacific sea surface, and it influences both the local and remote atmospheric circulation patterns. ENSO has a widespread impact on world ecology, society and economics, and great effort is made to predict ENSO at seasonal lead times using both statistical and dynamical methods.

Statistical seasonal forecasting methods rely on predicting some index of climate variability (for example the ocean temperature anomalies in the eastern tropical Pacific—the Nino-3 index) and deducing the local and remote impacts (so-called teleconnection patterns) using canonical relationships established from prior observatiois. However, often these relationships are insufficiently accurate and result in erroneous predictions.

Dynamical methods for forecasting use coupled atmosphere-ocean global circulation computer models (AOGCM) that solve the physical equations of the system and represent the complex interactions between all aspects of the climate system. An example of such a system is that in current use at the European Centre for Medium Range Weather Forecasting. In the accompanying drawings FIG. 1 illustrates how such a computer model is used. Firstly, observations 1 of the current state of the climate system are acquired, and these are input into the model at 2 (known as assimilation) to produce a best estimate of its current state. The model is then run forward in time to produce the forecast 4. As illustrated in FIG. 1, rather than running the model once, from a single initial state, a range of different initial states is used at 3 (by perturbing the initial state given by assimilation) so that a number of forecasts are produced which are hoped to span the range of future weather states consistent with current information. This "ensemble initialization" process, though, is difficult and problematic. For instance, simply replacing variables in the model with the currently observed values results in a model state which is very different from a state the model would generate "naturally" through its own operation. Gaps and errors in the observations and models introduce discontinuities from which unrealistically large-amplitude waves propagate as soon as the forecast is launched. A wide range of techniques have been developed to assimilate data into models to initialise forecast with a reasonably balanced state, but they are time-consuming and problems remain. One problem is that the models have a base model climate (ie the mean annual cycle generated by running the model for a long time period given only the external boundary conditions on the climate system) which is different from the observed climate. This means that as soon as the forecast is launched, the model begins to drift back to its own base climate. Over a 10-day weather forecast, these drifts may be relatively unimportant. But for a seasonal time scale, the drift may be comparable or larger than the signals being forecast. Thus while such an appraoch may be useful for short term forecasting, it is more differcult to use for seasonal forecasting.

A traditional way to forecast the weather (as used in, for example, the 1950's) was to examine historical weather maps for situations which are analogous to the present conditions, referred to below as "analogs", and then base a forecast on some weighted average of the evolution of the analog states found. This can be regarded as an example of a method known as a "perfect ensemble" which involves choosing analogs which are naturally in a state similar to the present state, and then using them for predictive purposes. However, a difficulty with this approach in weather forecasting is that the "return-time" of the atmosphere has been estimated to be of the order of many millions of years. That is to say forecasters would have to wait for this length of time before having a reasonable chance of observing a single atmospheric state consistent with the analysis on a particular day. Thus, this approach has been superseded by the use of the computer models mentioned above.

An approach to long-term climate prediction has been proposed which uses distributed computing, namely the distribution of climate models to a plurality of personal computers, in which models are allowed to run over a period from the past to the future, and those simulations which are consistent with recent observed climate change are used as the basis for ensemble forecasts of the future change. However, the climate prediction problem is fundamentally different from seasonal forecasting, because in climate prediction the main source of uncertainty lies in the response of the climate to changing boundary conditions: that is drivers such as changing levels of anthropogenic greenhouse gases. However, for seasonal forecasting the main source of uncertainty is chaotic error growth given possibly very small errors in the initial conditions. Thus these are initial-condition or first-kind, prediction problems, which are quite different from the boundary-condition or second-kind prediction problems in climate prediction.

The present invention is concerned with a method of producing a weather forecast comprising the steps of running an ensemble of coupled atmosphere-ocean global circulation computer models from different initial values, comparing the atmosphere-ocean states predicted by each of the models with a corresponding set of real-world observations, selecting those model states which fit to a predetermined extent the set of observations, and producing a weather forecast from the atmosphere-ocean states subsequently predicted by the selected models.

Thus the present invention lies in applying the "perfect ensemble" approach to the short to medium term forecasting problem. It is expected to be particularly useful for seasonal forecasting. The inventors have found that although the timescales for seasonal forecasting are long, and thus one might expect the perfect ensemble approach (which failed for short-term forecasting) to have even more difficulties on seasonal timescales, in fact the number of important independent degrees of freedom in the initial state of a seasonal forecast is lower than the number of degrees of freedom in a (short-term) atmospheric weather forecast Thus the effective return-time in a seasonal forecasting problem is likely to be relatively short for many variables of interest. This means that a seasonal forecasting model can be run for the equivalent of only centuries of model time to explore the fill range of large-scale ocean-atmosphere states relevant to the seasonal forecasting problem.

With the present invention, therefore, the ensemble members are not, themselves, constrained by direct observations of the present state and evolution of the system, but instead a comparison with observations over an analysis period is used to select and weight members of a sub-ensemble, and the sub-ensemble is then used to make the forecast. The forecast may use a weighted average of trajectories drawn from the ensemble and an estimate of anticipated forecast skill may be provided by the spread of these trajectories.

The set of real-world observations may include observations on the near recent (within one week) state of the atmosphere-ocean system, or the past state of the atmosphere-ocean system over the length of time relevant to the forecast phenomena of interest (this will typically be comparable or longer than the forecast lead time, so data over the past year would be used for six a month forecast).

The set of real-world observations may include observations of the current and past state of the atmosphere-ocean system, such as atmosphere winds, temperatures, pressure, cloud properties, precipitation, surface fluxes, sea level, sea surface temperatures, ocean thermal structure, salinity, soil moisture, vegetation, sea ice and derivatives thereof.

The computer model used may be selected from any suitable model such as the UK Meteorological Office Unified model or the NCAR Community Climate System model. The initial states may be at different points on the climate attractor of the model.

The forecast may be tailored to the requirements of a particular user by interrogating the statistics of the ensemble model simulations to identify skilful predictors under both general and particular regimes. For instance, it may be desired to make a seasonal forecast in relation to only certain aspects of the climate, in which case statistical analysis of the models' output is used to identify which model variables are good predictors for the aspect of the climate of interest, then those models in the ensemble which have the closest match to those predictors are used for the forecast Similarly, one may be interested in a forecast for a particular geographical region, in which case skilful predictors of the weather in that region may be identified, and the models which have the closest match to the current and past values of those predictors are used in the forecast. The forecast may be generated by weighting the contribution made by each of the models in accordance with the closeness of the fit. The fit may be judged by criteria defined by the user. Each user may have a particular threshold for certain weather anomalies, and will select criteria accordingly.

Preferably the models are distributed over a plurality of personal computers. This provides a great deal of computing power. Developments in personal computer technology mean that climate prediction models which formerly would only run on supercomputers, can now be run on a conventional personal computer. Because the vast majority of computer processors, particularly in desk-top personal computers, sit idle for over 90% of the time, a large number of models can be distributed to such personal computers (for instance owned by the general public, or by medium or large organisations) to be run in the otherwise idle time of the computers. Conveniently a client-server arrangement is used in which the server distributes the models to the clients and the clients report back to the server the results of running the model. The models may be left running on the clients, and when it is desired to make a forecast, the server mines the results stored on the personal computers. For instance, the server may cause an additional job to run on each client to identify whether its results to date satisfy the conditions desired for that forecasting problem and thus whether it will be a member of the sub-ensemble. All members of the sub-ensemble then return their subsequent results to the server for the forecast to be generated.

The invention extends to a distributed computing system comprising a server and a plurality of clients as mentioned above, and also to software for distribution to the clients for use in such a distributed computing system.

BRIEF DESCRIPTION OF THE DRAWINGS

The invention will be further described by way of example with reference to the accompanying drawings in which.

DETAILED DESCRIPTION OF EXAMPLE EMBODIMENTS

Figure 1:
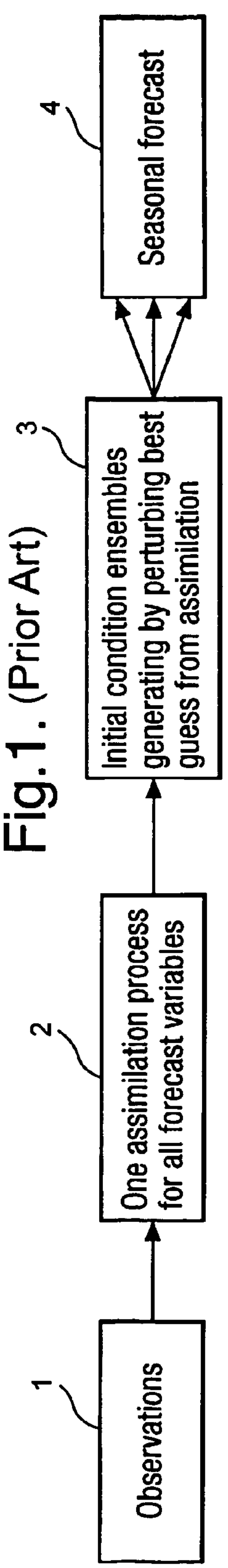
FIG. 1 illustrates schematically the prior state-of-the-art ensemble method of seasonal forecasting.
Figure 2:
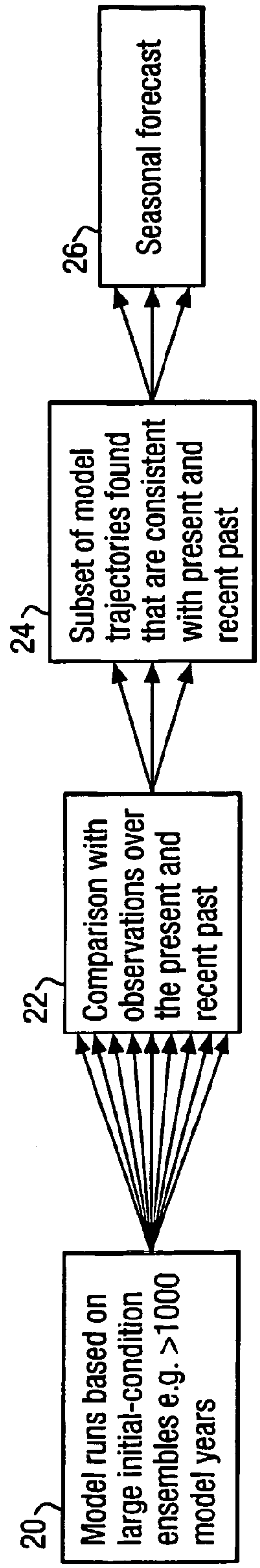
FIG. 2 illustrates schematically an ensemble method of seasonal forecasting in accordance with an embodiment of the present invention.

FIG. 2 illustrates the first embodiment of the present invention. As indicated at step 20 an a-ogcm is set running from a large number of different initial conditions on around 10,000 personal computers. The different initial conditions are obtained by picking different points on the "climate attractor" estimated from a long base-line integration of the model. These points are generated by performing ensembles of the order of 100 ensemble members. Thus on a two year, 100 ensemble matrix, each will create another 100 perturbations, giving the 10,000 members. Hence, it is not necessary to run the model for 10,000 years to get 10,000 sets of initial conditions.

The results of the model runs are then compared at step 22 with real-world observations over the present and recent past. The observations may be of the current and past state of the atmosphere-ocean system, such as atmospheric winds, temperatures, pressure, cloud properties, precipitation, surface fluxes, sea level, sea surface temperatures, ocean thermal structure, salinity, soil moisture, vegetation, sea ice and derivatives thereof. At step 24 a subset of the model trajectories are selected which are consistent, or show the best consistency, with the observations. The results from this subset of models are then used to make the seasonal forecast at step 26. The seasonal forecast may be made by combining the results of the subset of models, and the combination may be weighted in accordance with the closeness of the fit of the model to the observations.

It is also possible to provide an estimate of the likely accuracy of the forecast by examining whether the model trajectories in the subset remain in close proximity to each other over the forecast period. If they do then the climatic situation is regarded as potentially predictable. However, if the trajectories diverge rapidly, it is clear that the situation is not very predictable, and the forecast may be less accurate.

An example of the results of running a limited set of ensemble experiments is illustrated in FIG. 5 applied to seasonal forecasts of the El Nino Southern Oscillation (ENSO). The black curves (v) in the FIGS. 5(*a*), (*b*) and (*c*) show the departures from climatology of sea surface temperature anomalies averaged in the region of 150° W-90° W, 5° S–5° N—the NINO3 index which is a good indicator of ENSO. The red curves (w) show ensemble mean forecasts of NINO3 at 3, 6 and 9 month lead times in the $1^{st}$, $2^{nd}$ and $3^{rd}$ panels. The error bars show the uncertainty in the forecasts and are derived from the ensemble spread. These ensemble forecasts were achieved by searching through 380 years of AOGCM simulations and selecting analog states based on the ocean temperatures in the upper 500 m of the tropical Pacific Ocean. Verification scores, in terms of the correlation of the forecast and observed NINO3 index, and the root mean squared error are shown in the FIGS. 5(*d*) and (*e*) respectively. This initial application of the method shows potential forecast skill out to 12 months.

In this case the number of simulations used to explore the "climate attractor"of the AOGCM was small and thus only limited forecasts of the observations were possible. Increasing the number of initial simulations by using as many personal computers as possible allows more regions of the attractor to be explored leading to a greater "hit rate" of analog states and a more complete set of forecasts. Also, no attempt was made systematically to optimise the algorithm used to search for the analog states so that skill could be improved. In order to tailor the forecast to the individual user's needs, a further set of AOGCM simulations can be performed based on the evolution of meterorological variable to which the user is most sensitive.

Figure 3:
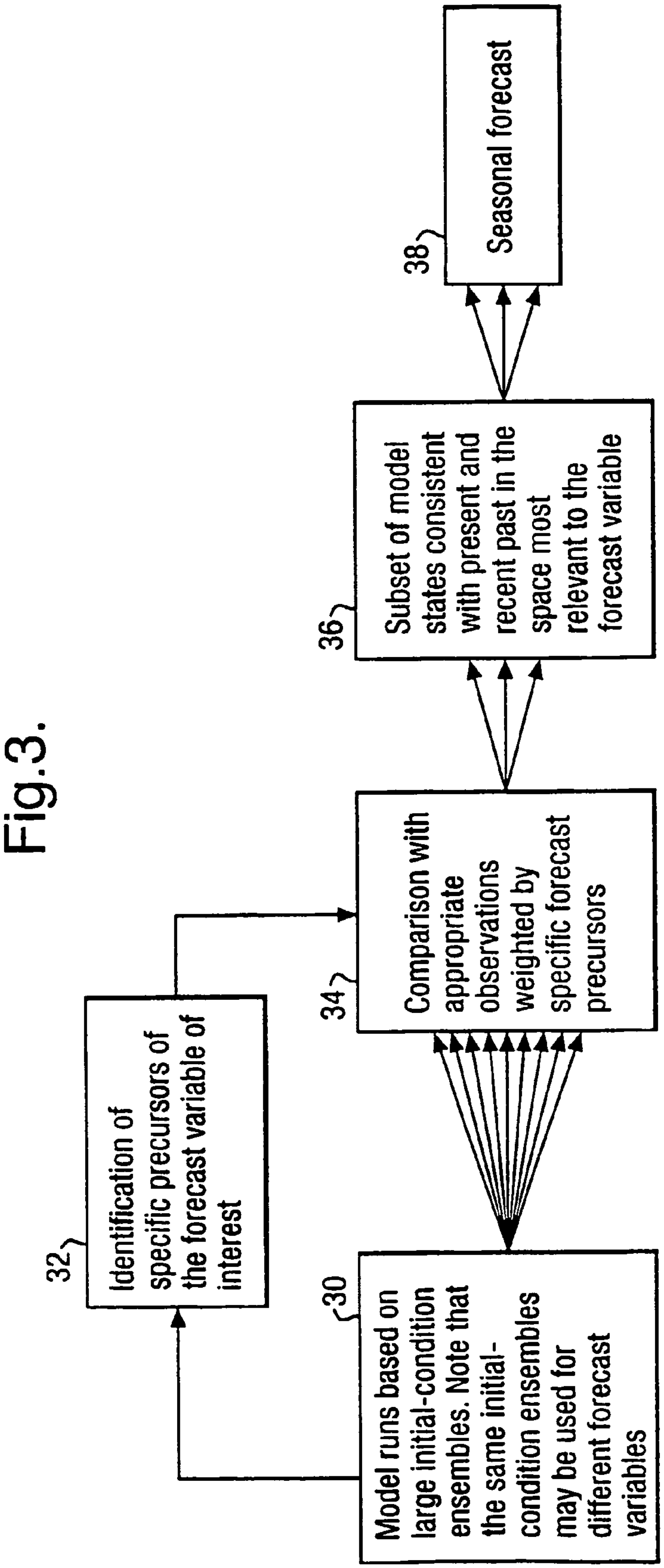
FIG. 3 illustrates a modification of the method of FIG. 2.

A modification of the above embodiment is illustrated in FIG. 3. In this embodiment aspects of the climate system which provide skilful predictors for a small number of key climate variables are identified. This first involves in step 30 taking the results of a number of models, for instance as generated in the above embodiment, and measuring the rate of divergence of nearby model trajectories against the average climatological spread to see what is potentially predictable (the predictands). Then, using an appropriate statistical technique such as linear regression, suitable predictors can be identified for those predictands in step 32. These predictors then define the optimum climate variables (for the predictand in question) that are placed in the database from which the suitable analog (to the observed current weather situation) can be drawn. It will be appreciated that for different forecast variables different predictors may be used, but these may be drawn from models with the same initial conditions. For example, the ENSO phenomenon is known as a predictable component of the climate system, with its predictors being, in the first instance, the ocean temperature and heat content anomalies in the six months running up to the forecast start. Thus in this simple case the ocean temperature and heat content anomalies are regarded as the predictors, and to make a forecast of the ENSO phenomenon, those models whose ocean temperature and heat content anomalies match the current and recent past observed values of these are used in the forecast. Again, the forecast may be generated by weighting the models in accordance with the match of the specific predictors as illustrated at step 34. As illustrated at step 36, this results in the selection of a subset of the model states. The seasonal forecast can then be generated at step 38 using this subset of the model states.

Figure 4:
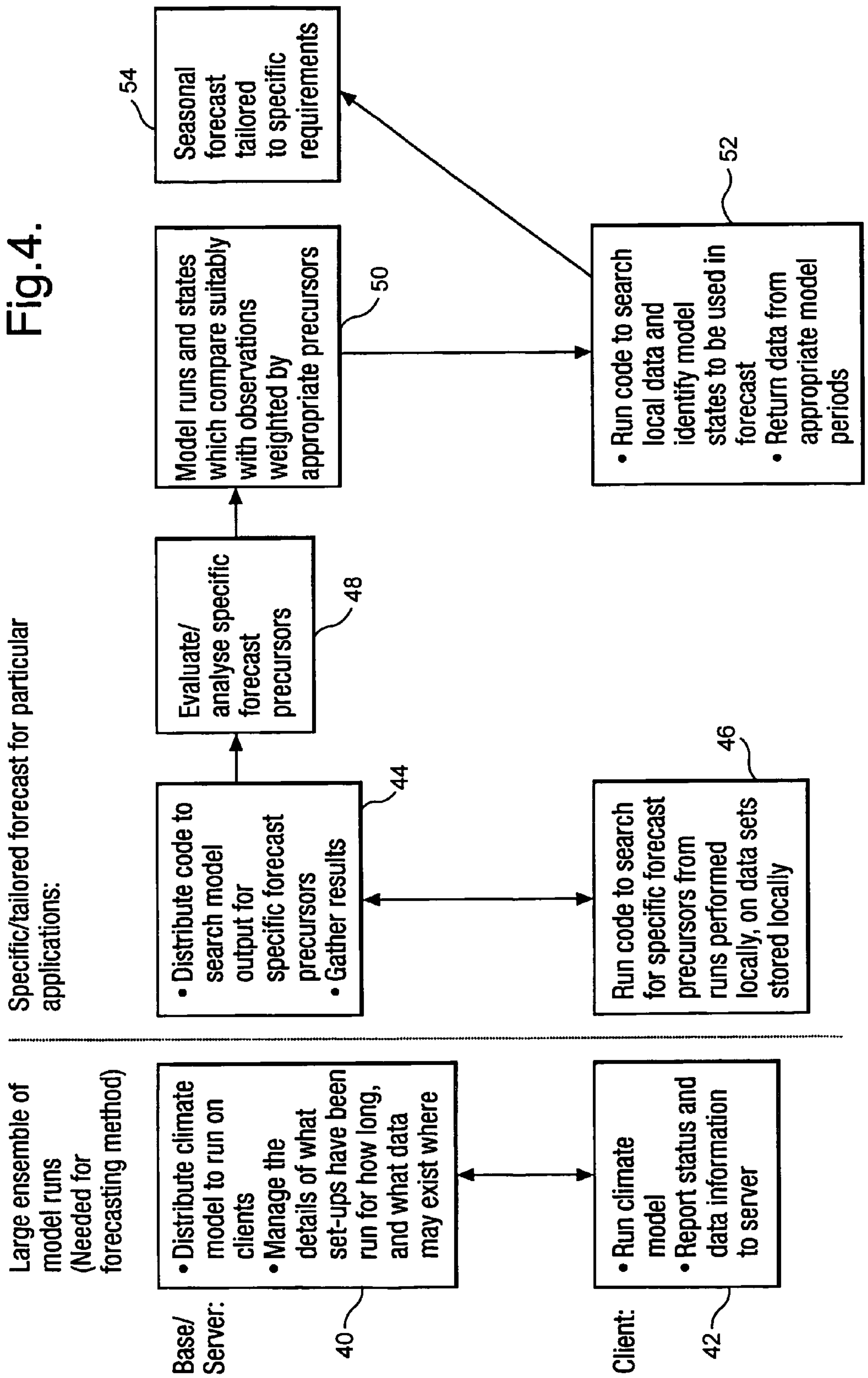
FIG. 4 illustrates schematically the client-server arrangement for use in the embodiment of FIG. 3.
Figure 5A:
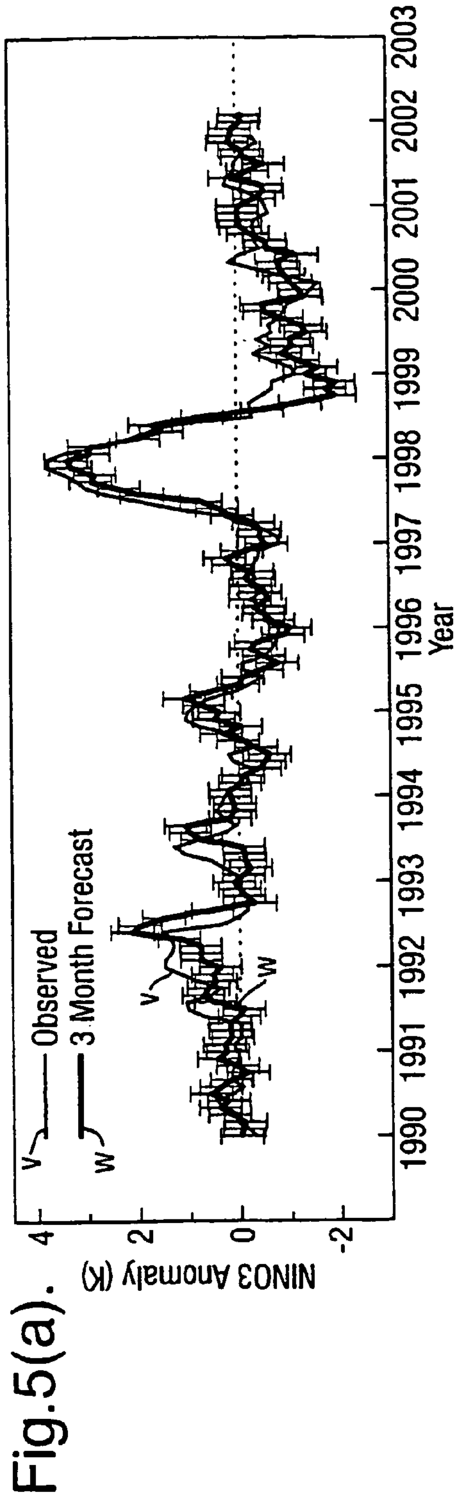
FIG. 5 illustrates the results obtained by a limited version of the embodiment of FIG. 2.
Figure 5B:
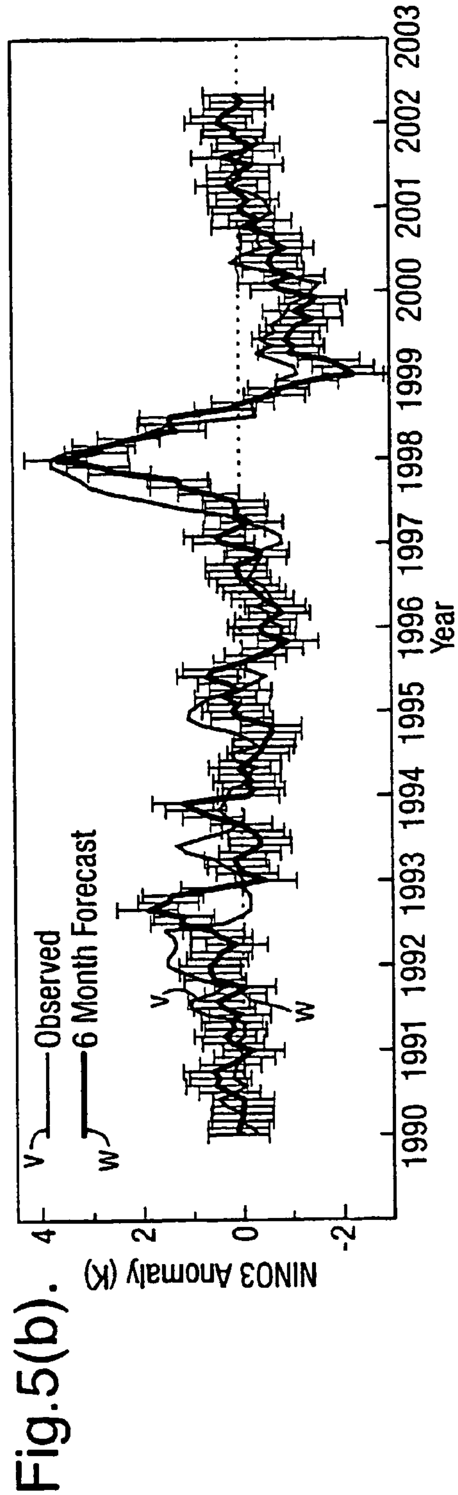
Figure 5C:
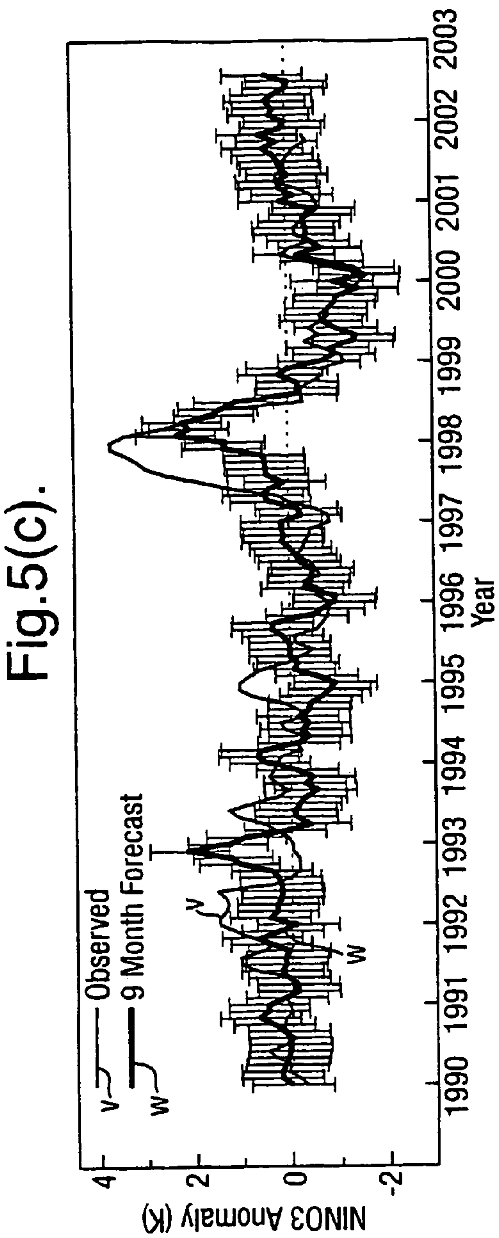
Figure 5D:
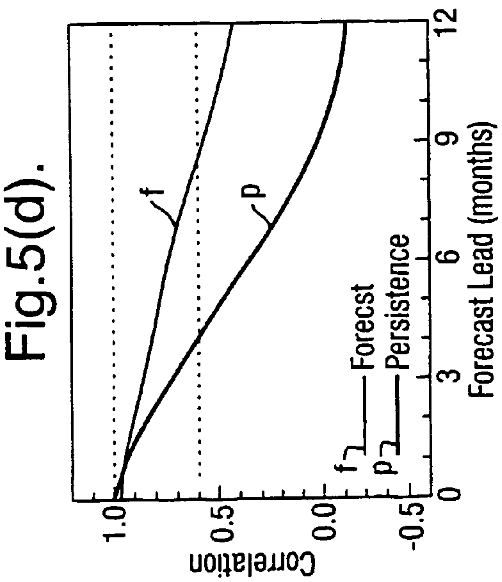
Figure 5E:
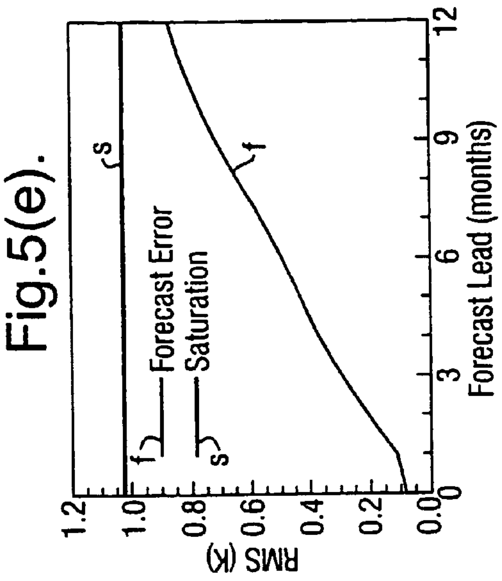

FIG. 4 illustrates schematically the client-server arrangement for use in the embodiment of FIG. 3. The server has the function, as illustrated at 40, of distributing the climate model to run on the clients and managing the details of how long the clients have been running and what data they may have produced. As illustrated at 42, the clients run the climate models and report their status and data information to the server in order to produce a specific or tailored forecast for a particular application. The server distributes code to search the model outputs for specific forecast precursors and then gathers the results as indicated at 44. Correspondingly the clients run the code to search for specific forecast precursors on the data sets stored locally (i.e. which result from the locally performed runs) as illustrated at 46. The server then evaluates and analyses the specific forecast precursors at 48 and it then weights those of the model runs and current states which compare well according to the specific forecast precursors as illustrated at 50. The clients then search the local data from the appropriate models according to the weighting, as illustrated at 52, and the data which is found is used to generate the tailored forecast as illustrated at 54.

A key advantage of this approach over conventional forecasting methods is that the relative weights applied to the predictors (and hence to observations of different variables or regions) can be tailored to the user's individual requirements at minimal additional cost. This will be particularly advantageous for users who are sensitive to weather variables or regions that are not typically given high weight in the optimisation of conventional forecasting systems. For example, the forecast may be refined by searching for further predictors, such as atmospheric winds, temperatures, pressure, cloud properties, precipitation, surface fluxes, sea level, sea surface temperatures, ocean thermal structure, salinity, soil moisture, vegetation, sea ice and derivatives thereof.

The reliability of the ensemble forecast may be established by judging whether the forecast indices of a particular climate variable is found to be insensitive to the size of the base ensemble. If it is then the results have converged and are likely to be reliable. However if the distribution changes as the ensemble size increases, then the results have not converged for that particular variable. It is also possible to make a probabilistic forecast by selecting a number of result sequences, weighted by their proximity to the observations. Further, it is possible to attempt to forecast historical climate events to judge the reliability of the forecast, or of course to apply known corrections for the particular computer model used.

As mentioned above the forecast may be tailored for a particular user. Different observations are likely to be relevant to different specific forecast variables. For instance, a forecast of ENSO might not be of use for any business sensitive to European weather, as ENSO has only a limited impact in that region. An advantage of the present invention is that instead of relying on a single measure of model-data goodness-of-fit, as forecasting centres do at present, the same ensemble of models can be interrogated repeatedly to provide optimised forecasts for specific forecast variables such as Indian monsoon rainfall, which might require special attention to be paid to the model-data fit in the Indian Ocean, or north western European summer temperature, which may be sensitive to north Atlantic sea surface temperatures. Thus a different subset of ensemble members, or a different weighting of the ensemble members and a different forecasting analog will be appropriate to different forecast indicies.

The process may be further optimised by expanding the ensemble, indicating new runs based on those members that resemble recent observations most closely. This allows computing power to be used most effectively.

What is claimed is:

1. A method of producing a weather forecast comprising the steps of running an ensemble of coupled atmosphere-ocean global circulation computer models from different initial values, comparing the ocean-atmosphere states predicted by each of the models with a corresponding set of real-world observations, selecting those models which fit to a predetermined extent the set of observations, and producing a weather forecast from the ocean-atmosphere states subsequently predicted by the selected models.

2. A method according to claim 1 wherein the set of real-world observations include observations on the near recent state of the atmosphere-ocean system.

3. A method according to claim 1 wherein the set of real-world observations include observations on the past state of the atmosphere-ocean system.

4. A method according to claim 3 wherein the set of real-world observations include observations on the state of the atmosphere-ocean system for up to 200 years.

5. A method according to claim 3 wherein the set of real-world observations include observations on the state of the atmosphere-ocean system for up to 100 years.

6. A method according to claim 3 wherein the set of real-world observations include observations on the state of the atmosphere-ocean system for up to 50 years.

7. A method according to claim 3 wherein the set of real-world observations include observations on the state of the atmosphere-ocean system for up to 3 years.

8. A method according to claim 3 wherein the set of real-world observations include observations on the state of the atmosphere-ocean system for less than one year.

9. A method according to claim 1 wherein the set of real-world observations include observations on the atmospheric winds, temperatures, pressure, cloud properties, precipitation, surface fluxes, sea level, sea surface temperatures, ocean thermal structure, salinity, soil moisture, vegetation, sea ice and derivatives thereof.

10. A method according to claim 1 wherein the ensemble of coupled atmosphere-ocean global circulation computer models are run from initial states which are on different points on the attractor of the climate model.

11. A method according to claim 1 wherein the step of comparing the ocean-atmosphere states predicted by each of the models with a corresponding set of real-world observations comprises comparing predicted values of at least one of: atmospheric winds, temperatures, pressure, cloud properties, precipitation, surface fluxes, sea level, sea surface temperatures, ocean thermal structure, salinity, soil moisture, vegetation, sea ice and derivatives thereof.

12. A method according to claim 1 wherein the step of comparing the ocean-atmosphere states predicted by each of the models with a corresponding set of real-world observations comprises comparing predicted values of model variables in a selected geographical area with corresponding real-world observations.

13. A method according to claim 1 wherein the step of comparing the ocean-atmosphere states predicted by each of the models with a corresponding set of real-world observations comprises analysing the model predictions to identify skilful predictors for one or more desired predictands, and wherein the models are selected on the basis of the fit between the identified predictors and the corresponding values in the set of real-world observations.

14. A method according to claim 1 wherein the weather forecast is produced by combining the predictions of the models with weights determined by the degree of fit to the set of real-world observations.

15. A method according to claim 1 wherein the degree of fit is judged by criteria tailored to specific end-users' requirements.

16. A method according to claim 1 wherein the process is further optimised by expanding the ensemble through initiating new runs based on those numbers which resemble recent observations most closely.

17. A method according to claim 1 wherein the models forming the ensemble of coupled atmosphere-ocean global circulation computer models are distributed amongst a plurality of computers.

18. A method according to claim 17 wherein a server is provided, said plurality of computers constituting clients of said server.

19. A method according to claim 17 wherein individual members of the plurality of computers communicate directly with each other to generate a forecast using peer-to-peer analysis and synthesis software, eliminating the need for a single control server.

20. A method according to claim 17 wherein the server distributes the coupled atmosphere-ocean global circulation computer models to the clients, and the clients report back to the server the results of running the models.

21. A method according to claim 18 wherein the step of comparing the ocean-atmosphere states predicted by each of the models with a corresponding set of real-world observations is conducted on the respective clients.

22. A distributed computing system comprising a server and a plurality of clients constituted by personal computers, the server and clients being programmed by program code means to execute the method of claim 1.

23. A server and software for distribution to clients for use in a distributed computing system to execute the method of claim 1.

24. A method according to claim 1 wherein the weather forecast is a seasonal weather forecast.

25. A method according to claim 1 wherein the set of real-world observations are limited to observations on the state of the atmosphere-ocean system for less than one year.

26. A method of producing a weather forecast comprising the steps of running an ensemble of coupled atmosphere-ocean global circulation computer models from different initial values, comparing the ocean-atmosphere states predicted by each of the models with a corresponding set of real-world observations, selecting those models which fit to a predetermined extent the set of observations, and producing a weather forecast from the ocean-atmosphere states subsequently predicted by the selected models, wherein the step of comparing the ocean-atmosphere states predicted by each of the models with a corresponding set of real-world observations comprises comparing predicted values of model variables in a selected geographical area with corresponding real-world observations.

27. A method of producing a weather forecast comprising the steps of running an ensemble of coupled atmosphere-ocean global circulation computer models from different initial values, comparing the ocean-atmosphere states predicted by each of the models with a corresponding set of real-world observations, selecting those models which fit to a predetermined extent the set of observations, and producing a weather forecast from the ocean-atmosphere states subsequently predicted by the selected models, wherein the step of comparing the ocean-atmosphere states predicted by each of the models with a corresponding set of real-world observations comprises analysing the model predictions to identify skilful predictors for one or more desired predictands, and wherein the models are selected on the basis of the fit between the identified predictors and the corresponding values in the set of real-world observations.

* * * * *